United States Patent [19]

Mizobuchi et al.

[11] Patent Number: 4,754,181
[45] Date of Patent: Jun. 28, 1988

[54] MAGNET COUPLING THROUGH ISOLATING PLATE

[75] Inventors: Shotaro Mizobuchi; Yoshikazu Kimura; Katsumi Sasaki, all of Kanagawa, Japan

[73] Assignee: Ebara Corporation, Tokyo, Japan

[21] Appl. No.: 50,280

[22] PCT Filed: Aug. 15, 1986

[86] PCT No.: PCT/JP86/00421

§ 371 Date: Apr. 8, 1987

§ 102(e) Date: Apr. 8, 1987

[87] PCT Pub. No.: WO87/01248

PCT Pub. Date: Feb. 26, 1987

[30] Foreign Application Priority Data

Aug. 16, 1985 [JP] Japan ............... 60-180149

[51] Int. Cl.⁴ .................. H02K 5/173; H02K 5/02
[52] U.S. Cl. ........................ 310/104; 310/86; 310/90; 384/610; 384/907.1; 417/420
[58] Field of Search ............. 310/86, 88, 90, 104, 310/266; 384/123, 369, 610, 907.1, 913; 417/420

[56] References Cited

U.S. PATENT DOCUMENTS

| | | | |
|---|---|---|---|
| 2,975,713 | 3/1961 | Wright | 310/104 |
| 3,195,035 | 7/1965 | Sudmeier | 417/420 |
| 3,310,693 | 3/1967 | Aronoff | 310/104 |
| 3,497,273 | 2/1970 | Muijderman et al. | |
| 3,711,171 | 1/1973 | Orkin | 384/907.1 |
| 4,207,485 | 6/1980 | Silver | 310/104 |
| 4,408,966 | 10/1983 | Maruyama | |
| 4,575,264 | 3/1986 | Mizobuchi | 384/369 |

FOREIGN PATENT DOCUMENTS

| | | | |
|---|---|---|---|
| 1124319 | 2/1962 | Fed. Rep. of Germany | 384/610 |
| 2025558 | 12/1970 | Fed. Rep. of Germany | 384/123 |
| 2058062 | 6/1971 | Fed. Rep. of Germany | |
| 2102520 | 4/1972 | France | |
| 45-30742 | 10/1970 | Japan | 310/104 |
| 55-21782 | 2/1980 | Japan | 310/104 |
| 202848 | 12/1982 | Japan | 310/96 |
| 60-14615 | 1/1985 | Japan | |

OTHER PUBLICATIONS

Patent Abstracts of Japan, vol. 4, No. 137 (E-27);[619] Sep. 25,1980; JP-A-5588545, Matsushita Denki Sangyo k. k., Jul. 4, 1080, Ooya.

Primary Examiner—Patrick R. Salce
Assistant Examiner—D. S. Rebsch
Attorney, Agent, or Firm—Wenderoth, Lind & Ponack

[57] ABSTRACT

A magnet coupling, in which a ceramic isolating plate 5 is provided between a driven magnet 4 and a drive-side magnet 3 and ceramic bearing members 13; 14 are placed between the respective sides of the isolating plate 5 and the driven magnet 4 and the drive-side magnet 3, whereby the gap between the drive-side and loadside is minimized.

8 Claims, 12 Drawing Sheets

MAGNET COUPLING THROUGH ISOLATING PLATE

TECHNICAL FIELD

The present invention relates to a magnet coupling which is usable in any environment (a gas, a fluid or a vapor) and improved in torque transfer efficiency.

BACKGROUND ART

Figure 17:
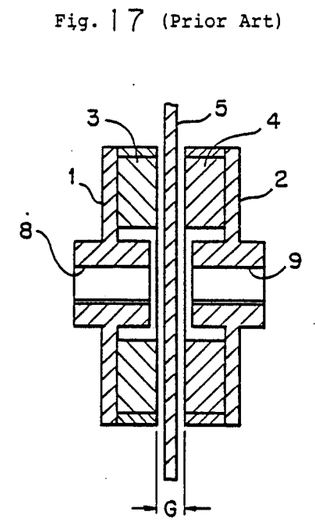
FIGS. 17 to 19 are vertical sectional views of prior arts.
Figure 18:
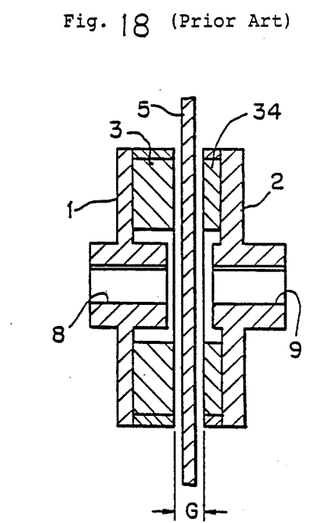
Figure 19:
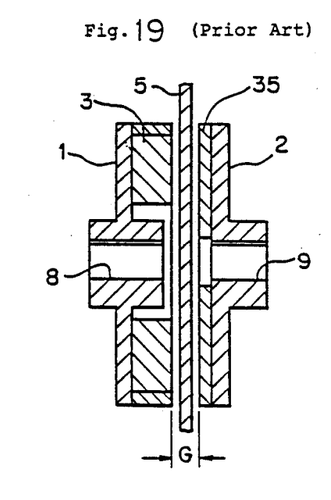

FIGS. 17 to 19 are vertical sectional views of conventional magnet couplings respectively. FIG. 17 shows a synchronous type magnet coupling in which magnets 3 and 4, each consisting of permanent magnets alternately different in polarity, are disposed on the peripheries of the respective end faces of a drive-side yoke 1 and a load-side yoke 2 which are rotatably supported, so that torque is transferred only when the yokes 1 and 2 rotate synchronously. FIG. 18 shows a hysteresis magnet coupling in which a magnet 3 and an isotropic magnet 34 are used on the drive and load sides respectively to transfer a predetermined torque independently of the number of revolutions. FIG. 19 shows an eddy current magnet coupling in which a magnet 3 is employed on the drive side, while a magnetic material such as carbon steel or cast iron is employed on the load side. In these magnet couplings, the drive side and the load side are spaced apart from each other, and an isolating plate 5 is disposed in the illustrated gap G between the drive and load sides so that the drive side is not affected by the load-side environment.

As illustrated, keyways are cut in respective central bores 8 and 9 of the yokes 1 and 2, and drive and driven shafts are fitted into these keyways and thus rotatably supported by the axially outer portions, respectively, of the magnet coupling.

In all of these magnet couplings the smaller the illustrated gap G, the greater the value of transferred torque. However, in the conventional magnet couplings, the isolating plate 5, which isolates the drive and load sides from each other, involves deviations in terms of the machining accuracy and the axial center, and each of the members of the magnet coupling on the drive and driven sides is supported in a cantilever manner, which means that the support conditions are inferior and readily affected by wear of bearings or the like. Accordingly, the gap G is generally set at 5 to 10 mm, modally a value close to 10 mm. It is particularly difficult to produce the eddy current coupling shown in FIG. 19, because the control of the gap is effected through a non-magnetic disk plate 35, and the transferred torque is particularly weak in this case.

10 In the prior art it is necessary to provide gaps between the isolating plate 5 and the drive-side magnet 3 and the isolating plate 5 and the load-side driven magnet 4 or magnetic yoke 2, respectively, and the drive- and load-side rotary members cannot be rotatably supported at the sides thereof which are closer to the isolating plate 5. Accordingly, the size of the device is unavoidably increased in its axial direction, because of to the structures of bearings for thrust and radial directions which support the attraction forces on the drive and load sides of the magnet coupling, or the bearing portions complicate the arrangement of the device. In a device which handles a fluid, for example, a pump, the bearing portion interferes with the flow path resulting in problems such as an increase in the fluid resistance.

DISCLOSURE OF INVENTION

It is an object of the present invention to eliminate the above-described problems in the magnet couplings having drive- and load-side members disposed across an isolating plate and provide a magnet coupling in which the gap between the drive and load sides is reduced and the power transfer efficiency is greatly improved.

It is another object of the present invention to provide a magnet coupling which is particularly designed so that the structure for supporting the load-side rotary member can be simplified.

The present invention provides a magnet coupling having a load-side rotary member and a drive-side rotary member hermetically coupled through an isolating plate and connected together by means of magnetic couplings, characterized in that a bearing is provided between the isolating plate an the load-side rotary member and/or between the isolating plate and the drive-side rotary member.

Since a bearing is provided between the isolating plate and the drive-side rotary member and/or between the isolating plate and the load-side rotary member, the isolating plate and the rotary member concerned can be brought into contact with each other, which means that the drive-and load-side rotary members are close to each other and the magnetic drive force is therefore efficiently transferred from the drive side to the load side, resulting in an increase in transferred torque.

BRIEF DESCRIPTION OF DRAWINS

FIGS. 2 and 3 are front and rear views, repectively, of the isolating plate shown in FIG. 1;

BEST MODE FOR CARRYING OUT THE INVENTION

Figure 1:
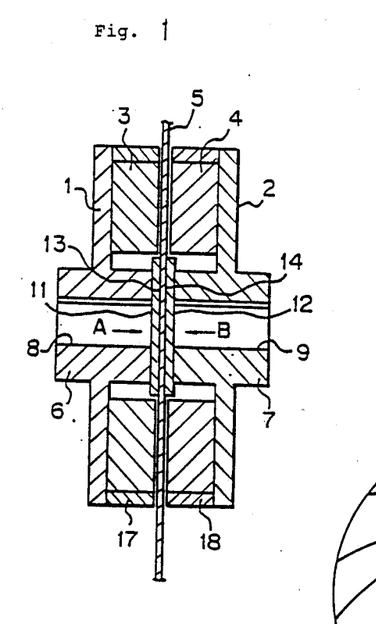
FIG. 1 is a vertical sectional view of one embodiment of the present invention.

Embodiments of the present invention will be described hereinunder with reference to the drawings. FIG. 1 is a vertical sectional view of a synchronous magnet coupling. An isolating plate 5 which is flat and made of a non-magnetic ceramic material, for example, silicon carbide SiC, is interposed between magnets 3 and 4, having permanent magnets which are alternately different in polarity and which are respectively disposed on the peripheries of the opposing end faces of a drive-side yoke 1 and a load-side yoke 2 which is concentric with respect to the yoke 1, a very small gap being provided between each of the permanent magnets 3 and 4 and the isolating plate 5. Bosses 6 and 7 are respectively provided integral with the central portions of the yokes 1 and 2, and keyways are provided in central bores 8 and 9 of the bosses 6 and 7 so that drive and driven shafts are fitted into the bosses 6 and 7 in such a manner that the shafts are rigid against rotation. Backing plates 11 and 12 are respectively bonded to the opposing end faces of the bosses 6 and 7. The backing plates 11 and 12 may however, be replaced with another fixing means, provided that the employed means can be secured to each of the bosses 6 and 7 rigidly in both rotational and axial directions.

Figure 2:
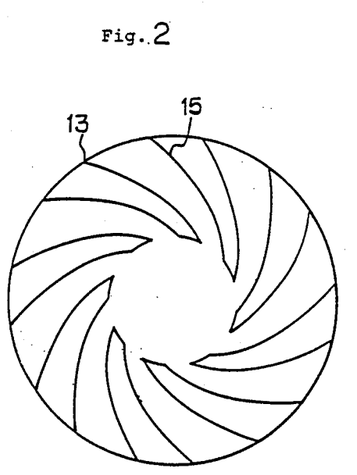
Figure 3:
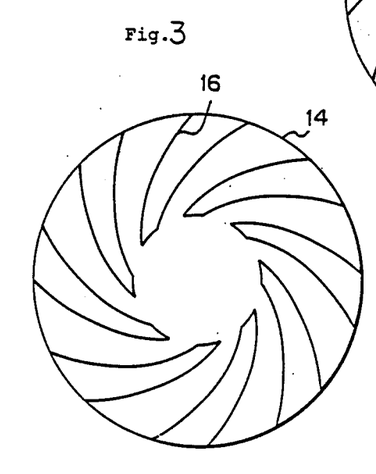

FIG. 2 is an illustration of the isolating plate 5 shown in FIG. 1 as viewed in the direction of the arrow A, and FIG. 3 is a similar illustration of the isolating plate 5 as viewed in the direction of the arrow B, these figures showing the central portion of the isolating plate 5. The backing plates 11 and 12 can be in contact with the isolating plate 5 at this portion through a minute film of fluid, for example, about 1 to 3 μm. Thrust bearing portions 13 and 14 are provided in the central portion of the isolating plate 5. The respective surfaces of the bearing portions 13 and 14 slightly project and have respective spiral grooves 15 and 16 which are equally disposed thereon in such a manner that the grooves 15 and 16 extend from the outer peripheries of the bearing portions 13 and 14 which are substantially equal in diameter to the backing plates 11 and 12 at this portion( the grooves 15 and 16 terminating toward the center. The spiral grooves 15 are twisted in a direction in which a dynamic pressure is generated between the backing plate 11 and the thrust bearing portion 13 when the backing plate 11 is rotate in the direction of rotation of the drive-side yoke 1. The rotation of the drive-side yoke 1 causes the yoke 2 to rotate in the same direction through the magnet 3 which attracts the magnet 4. The direction of the spiral grooves 16 in the thrust bearing portion 14 is determined so that, when the backing plate 12 rotates in response to the rotation of the yoke 2, a dynamic pressure is generated between the backing plate 12 and the bearing portion 14.

The reference numerals 17 and 18 denote aluminum or brass rings fitted on the outer peripheries of the magnets 3 and 4, respectively, to limit leakage of magnetic field.

For example, the backing plates 11 and 12 have a diameter of 60 mm and a thickness of 1 to 2 mm while the isolating plate 5 has a thickness of about 2 mm, and the spiral grooves 15 and 16 have a depth of about 3 to 50 μm. The spiral grooves 15 and 16 are formed by means of shot blasting, using a mask covering each of the thrust bearing portions.

In this embodiment, the drive side where a prime mover is present, and the load-side where a working machine is present can be isolated from each other by means of the isolating plate 5. Accordingly, in the case where the loadside machine is defined by, for example, a pump which is in a liquid being handled, the pump handling liquid may be employed as a lubricant for the backing plate 12 and the thrust bearing portion 14, or a high-viscosity lubricant may be sealed between the backing plates 11, 12 and the thrust bearing portions 13, 14, respectively.

The experiment (independent test on bearings) carried out in each of the environments, that is, the atmosphere, water and a slurry, found that there was no damage to the bearing slide surface even after start and stop had been repeated thousands of times only with a high-viscosity lubricant, e.g., a silicone-containing grease, applied between the thrust bearing portions 13, 14 and the backing plates 11, 12, respectively. Further, since no slurry entered to reach the bearing surfaces, it is found to be effective that a high-viscosity lubricant is sealed in the area between the bearing surfaces. It should be noted that the load bearing capability is sufficient to bear a thrust load of 5,000 kgf at the time of generation of a dynamic pressure, and further, if a high-viscosity lubricant is present, the backing plates 11 and 12 have a resistance of 100 to 200 kgf also to the load applied in the direction in which they are separated from the isolating plate 5.

With the arrangement described above, the distance between the end faces of the magnets 3 and 4 can be reduced to about 2 mm, whereas it is 9 mm in art, so that the torque transfer capability is, greatly increased.

Figures 4, 5, 6, 7:
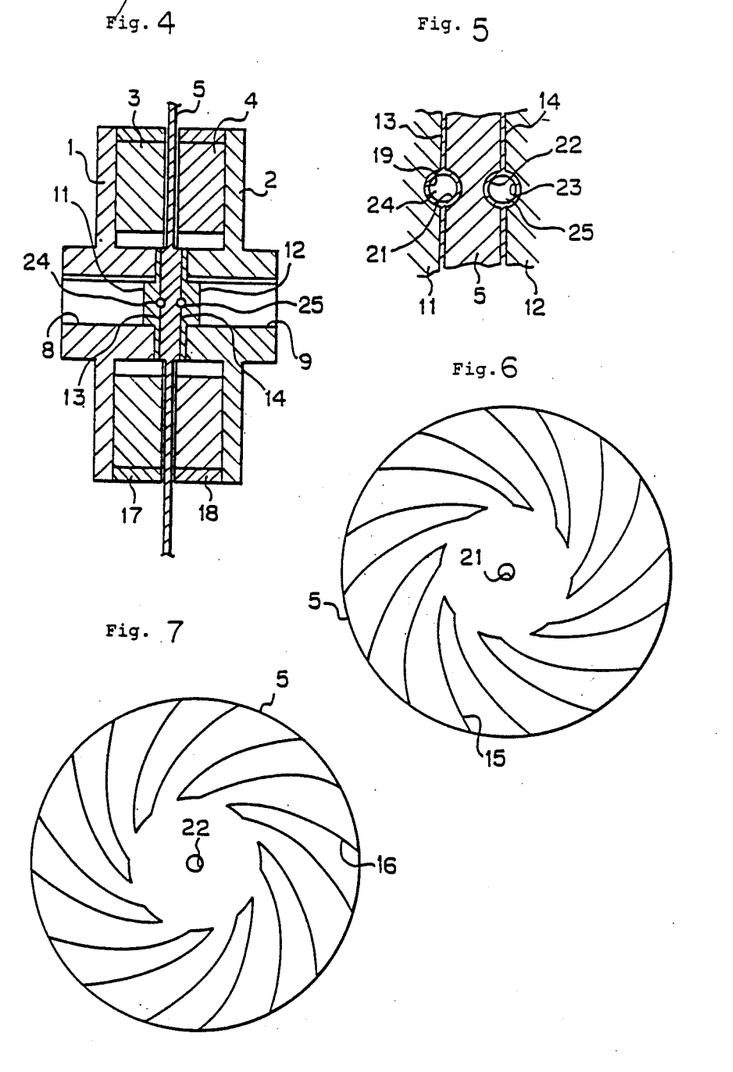
FIG. 4 is a vertical sectional view of another embodiment.
FIG. 5 is a fragmentary enlarged view of a part of the embodiment shown in FIG. 4.
FIGS. 6 and 7 are front and rear views, respectively, of the isolating plate shown in FIG. 4.

FIG. 4 is a vertical sectional view of another embodiment of the synchronous magnet coupling. The above-described embodiment has not only the function of a magnet coupling but also a function which enables it to carry a thrust load. However, the embodiment per se has no load bearing capability with respect to a radial load and therefore needs to provide a radial bearing on each of the drive and driven shafts which are respectively fitted into the central bores 8 and 9 in order to carry a radial load. The magnet coupling shown in FIG. 4 has the function of a magnet coupling and is capable of carrying thrust and radial loads. In FIG. 4, portions having the same functions as those shown in FIG. 1 are denoted by the same reference numerals, and detailed description thereof is omitted. Hemispherical recesses 19, 21 and 22, 23 are respectively provided in the opposing central portions of the backing plates 11, 12 and the thrust bearing portions 13, 14 formed in the center of the isolating plate 5, and small balls 24 and 25 are received therein, respectively, as shown in FIG. 5 which is an enlarged view of FIG. 4. The diameter of the small balls 24 and 25 is so set that, when the backing plates 11( 12 and the thrust bearing portions 13, 14 respectively come into solid contact with each other, the small ball 24 or 25 comes into contact with the ball receiving recesses 19( 21 or 22 23 or only a slight gap is present therebetween. It is preferable as in the above-described embodiment to seal a high-viscosity lubricant in the spaces defined between the small balls 24, 25 and the recesses 19, 21 and 22, 23 respectively, in addition to the spaces between the backing plate 11 and the thrust bearing portion 13 and between the backing plate 12 and the thrust bearing portion 14. FIGS. 6 and 7 are front views of the thrust bearing portions 13 and 14, respectively, which have spiral grooves 15 and 16 similar to those in the above-described embodiment except that these bearing portions 13 and 14 have the recesses 21 and 22, respectively.

In this embodiment, when a radial load is applied to a position on the drive or load side which is remote from the isolating plate 5, this radial load is carried between the small ball 24 and the recesses 19, 21 or the small ball 25 and the recesses 22, 23, and a moment generated due to the fact that the radial load is remote from the isolating plate 5 is supported by the suction adhering force between the backing plate 11 and the thrust bearing portion 13 or that between the backing plate 12 and the thrust bearing portion 14. Accordingly( it is possible to support the drive- and load-side rotary members without the need to rotatably support them by other means.

It is apparent that the present invention can be carried out in a hysteresis magnet coupling in the same way as in the above-described embodiments in the form of synchronous magnet couplings.

Figures 8, 9, 10:
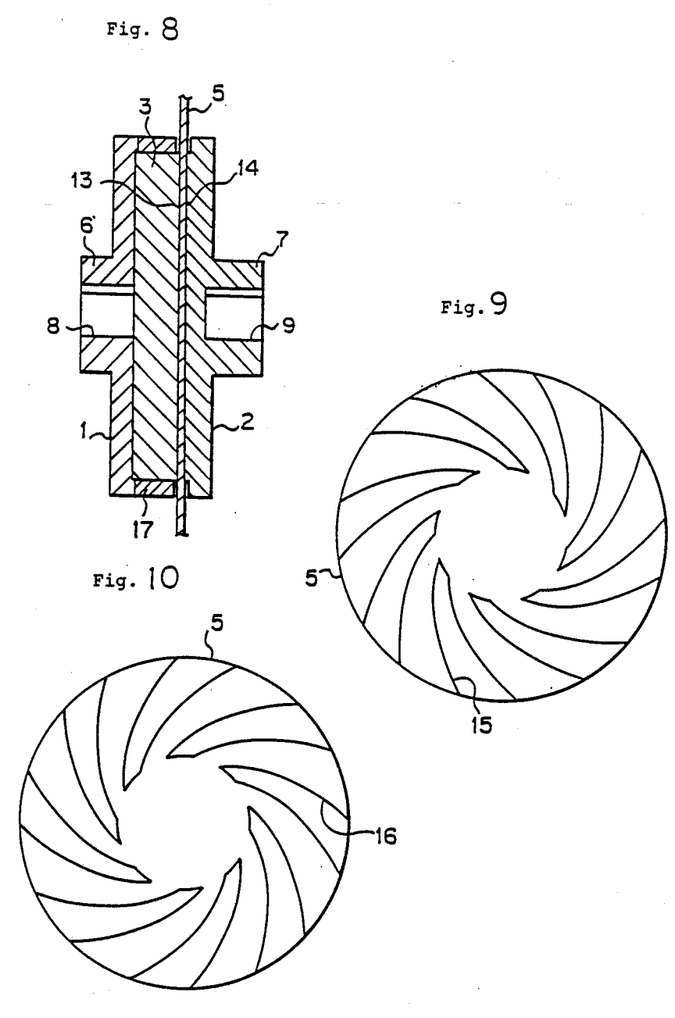
FIG. 8 is a vertical sectional view of still another embodiment.
FIGS. 9 and 10 are front and rear views, respectively, of the isolating plate shown in FIG. 8.

An embodiment in the form of an eddy current magnet coupling using electromagnetic induction current will next be explained. FIG. 8 is a vertical sectional view thereof. Portions having the same functions as those in the first embodiment are denoted by the same reference numerals, and detailed description thereof is omitted. That end face of the magnet 3 provided on the yoke 1 which faces the isolating plate 5 is in the shape of a flat plate, including the center thereof, and for the yoke 2 a material in which an eddy current is generated by the rotation of the magnet 3 is selected, the end face of the yoke 2 which faces the isolating plate 5 being in the shape of a flat plate and thus facing the magnet 3. A film of fluid having a thickness of less than several $\mu$m is disposed between the magnet 3 and the isolating plate 5 and between the yoke 2 and the isolating plate 5. The isolating plate 5 in this case has a thickness of 0.5 to 2 mm and is provided with spiral grooves 15 and 16 as shown in FIGS. 9 and 10 which are front views thereof as viewed from the drive and load sides, respectively, the grooves 15 and 16 being twisted in such directions that a dynamic pressure is generated toward the center of the thrust bearing portion 13 by the rotation of the magnet 3 and a dynamic pressure is similarly generated toward the center of the thrust bearing portion 14 by the rotation of the yoke 2 which is rotated while following the magnet 3 by means of the eddy current generated by the rotation of the magnet 3. Since the isolating plate 5 in this case needs to form a magnetic circuit, a material which is non-magnetic and, at the same time, a good conductor is employed for the isolating plate 5. For example, it is preferable to employ a ceramic material containing SiO or $Si_3N_4$ as its principal component and mixed with a component for improving the electrical conductivity.

In FIG. 8, as the yoke 1 rotates, the magnet 3 rotates in the same direction, and the yoke 2 is driven by the magnet 3 so as to rotate in the same direction. A dynamic pressure is generated toward the center in the area between the end face of the magnet 3 and the thrust bearing portion 13 to create a hydrodynamic lubrication state therebetween, and the rotation of the yoke 2 in the same direction causes a dynamic pressure to be generated in the area between the yoke 2 and the thrust bearing portion 14 to create a hydrodynamic lubrication state therebetween. For the formation of a liquid film between the isolating plate 5 on the one hand and the magnet 3 and the yoke 2 on the other an oil bath similar to that in the first embodiment may be employed, but it is preferable to seal a high-viscosity lubricant in the area therebetween because such a substance can be employed in any environments including the atmosphere gases and liquids.

In this embodiment, since the drive-side magnet 3 and the driven-side yoke 2 can be disposed close to each other to an extent which is substantially equal to the thickness of the isolating plate 5, it is possible to increase the transferred torque in eddy current magnet couplings of relatively low efficiency.

The embodiment shown in FIG. 8 has an extremely great load bearing capability with respect to opposing thrusts applied from the drive and load sides, respectively, and can bear about 100 to 200 kgf with respect to thrusts acting in the directions in which the drive- and load-side members are separated from the isolating plate 5 in a state where a high-viscosity lubricant is interposed. However, this embodiment cannot carry any radial load.

Figure 11:
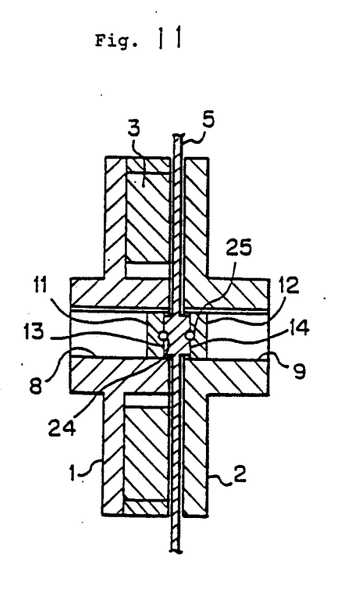
FIG. 11 is a vertical sectional view of a further embodiment.
Figure 12:
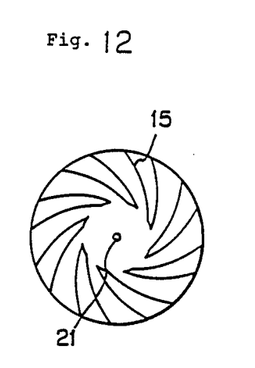
FIGS. 12 an 13 are front and rear views, respectively, of the isolating plate shown in FIG. 11.
Figure 13:
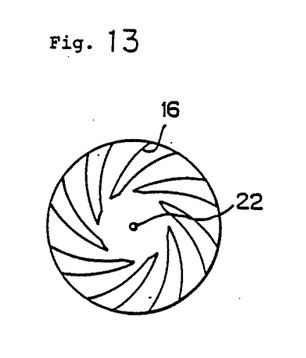

FIG. 11 shows a further embodiment in the form of an eddy current magnet coupling which is so designed that the efficiency is increased in the same way as in the above-described embodiments and it is capable of carrying both thrust and radial loads. In this embodiment, the central portion of the isolating plate 5 projects toward both sides so that the projecting ends define thrust bearing portions 13 and 14, respectively. Backing plates 11 and 12 are fitted into and fixed at the end portions of central bores 8 and 9 so that the backing plates 11 and 12 face the thrust bearing portions 13 and 14, respectively. Recesses 19, 21 22, 23 are provided to receive small balls 24 and 25 between the thrust bearing portions 13, 14 and the backing plates 11, 12 in the same way as in the embodiment shown in FIG. 5. The thrust bearing portions 13 and 14 are respectively shown in FIGS. 12 and 13 which are front views thereof, and as illustrated, the spiral grooves 15 and 16 are provided within the range of the backing plates 11 and 12, that is within the range which is substantially equal to the shaft diameter.

The gap between the isolating plate 5 and each of the portions of the magnet 3 and the yoke 2 other than the thrust bearing portions is selected to be 10 to 30 $\mu$m. This embodiment enables a radial load to be carried in the same way as in the synchronous magnet coupling including small balls which is shown in FIG. 4.

Figure 14:
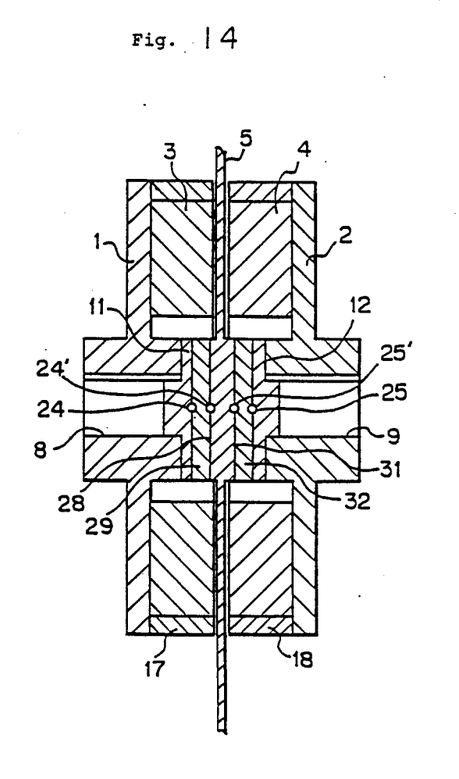
FIG. 14 is a vertical sectional view of a still further embodiment.
Figure 15:
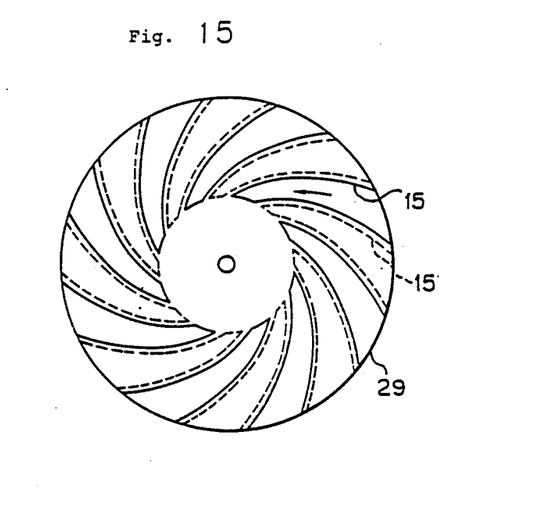
FIGS. 15 and 16 are front views of the isolating plate shown in FIG. 14.
Figure 16:
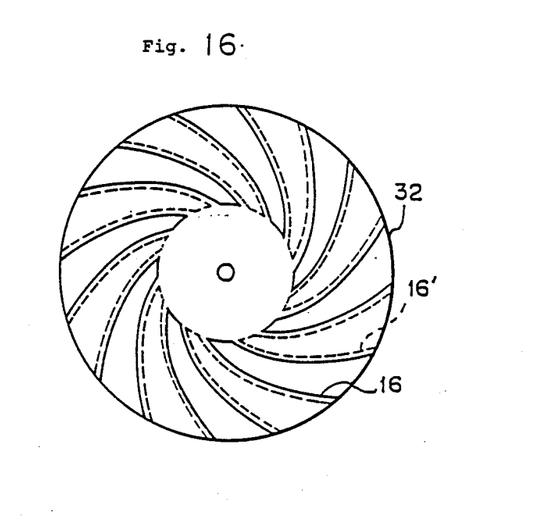

Each of the above-described embodiments is adapted for the case where the direction of rotation is fixed, while, in the case where the rotary members can rotate in both forwardly and backwardly, as shown in FIG. 14 an intermediate plate 29, which is provided in both surfaces thereof with spiral grooves 15 and 15' twisted in opposite directions as viewed from the respective surfaces as shown in FIG. 15 which is a left-hand side view, is interposed between the backing plate 11 that is secured to, for example, the yoke 1 and a flat surface portion 28 provided in the center of the isolating plate 5 through a film of liquid having a thickness of about 1 to 3 $\mu$m, and small balls 24 and 24' are received in hemispherical recesses respectively provided in the centers of the opposing surfaces of the intermediate plate 29 and the backing plate 11 and those of the intermediate plate 29 and the isolating plate 5. Similarly, an intermediate plate 32, which is provided in both surfaces thereof with spiral grooves 16 and 16' twisted in opposite directions as viewed from the respective surfaces as shown in FIG. 16 which is a right-hand side view, is interposed between the backing plate 12 that is secured to the yoke 2 and a flat surface portion 31 provided in the center of the isolating plate 5 through a film of liquid having a thickness of about 1 to 3 μm, and small balls 25 and 25' are received in hemispherical recesses respectively provided in the centers of the opposing surfaces of the intermediate plate 32 and the backing plate 12 and those of the intermediate plate 32 and the isolating plate 5.

In this case, the rotation of the yoke 1 in the counterclockwise direction as viewed in FIG. 15 causes the spiral grooves 15 to force the liquid to move toward the center, thereby generating a dynamic pressure in the center of the area between the backing plate 11 and the intermediate plate 29, and thus effecting hydrodynamic lubrication. At the same time, the counterclockwise rotation of the intermediate plate 29 causes the liquid in the center of the area between the intermediate plate 29 and the isolating plate 5 to be expelled toward the outer periphery through the spiral grooves 15' thus generating a vacuum which causes the intermediate and isolating plates 29 and 5 to adhere to each other by suction. The rotation of the yoke 1 in the direction reverse to the above causes the backing plate 11 and the intermediate plate 29 to adhere to each other by suction and allows the area between the intermediate plate 29 and the isolating plate 5 to serve as a hydrodynamic bearing.

The yoke 2 rotates in response to the rotation of the yoke 1. The rotation of the yoke 2 causes the backing plate 12 to rotate. If the yoke 2 rotates clockwise as viewed in FIG. 16, the backing plate 12 rotates in the same direction and the liquid is caused to move toward the center by the action of the spiral grooves 16' thus enabling the area between the backing plate 12 and the intermediate plate 32 to serve as a hydrodynamic bearing. At the same time, the intermediate plate 32 is activated to rotate clockwise while urging the liquid in the spiral grooves 16' to move toward the outer periphery, thus causing the intermediate plate 32 and the isolating plate 5 to adhere to each other by suction. The rotation of the yoke 2 in the direction reverse to the above causes the backing plate 12 and the intermediate plate 32 to adhere to each other by suction and permits the area between the intermediate plate 32 and the isolating plate 5 to serve as a hydrodynamic bearing for rotation of the yoke 2. Accordingly, the yoke 2 rotates forwardly or backwardly in response to the forward or backward rotation of the yoke 1. This embodiment can be applied to synchronous, hysteresis and eddy current magnet couplings.

Although in each of the above-described embodiments a slide surface provided with spiral grooves and a slide surface of an opposing flat plate which slides with respect to the former slide surface are specifically provided respectively, in a magnet coupling for rotation in one direction the arrangement may be such that either the backing plate 11 or 12 is provided with spiral grooves twisted in a direction in which a dynamic pressure is generated, and the thrust bearing portion of the isolating plate 5 which slides with respect to the backing plate provided with the spiral grooves is employed as the flat plate. The same is the case with a magnet coupling which is capable of rotation in both forward and backward directions, and in such a case spiral grooves may be provided in either one of the slide surfaces which oppose and slide with respect to each other.

Although in each of the embodiment a high-viscosity lubricant is sealed in the space between the slide surfaces in advance, a magnetic fluid may also be sealed, and in the case of using a magnetic fluid, a magnetic fluid retaining member which is defined by a ring-shaped magnet is preferably provided on the outer peripheral portion of each backing plate, the intermediate plate or the like.

Since in the present invention a hydrodynamic bearing having spiral grooves is formed, excellent performance is obtained, but for simplicity the arrangement may be such that the respective slide surfaces of flat plates are disposed in opposing relation to each other.

Although in the embodiments the bearings are respectively provided between the prime mover-side rotary member and the isolating plate and between the load-side rotary member and the isolating plate, the bearing may be provided only in the area between either one of the rotary members and the isolating plate.

An application example of the present invention in a pump will next be shown to describe the effect of the present invention even more clearly. Prior to the description of this application example, a pump employing a conventional magnet coupling will be explained below.

Figure 20:
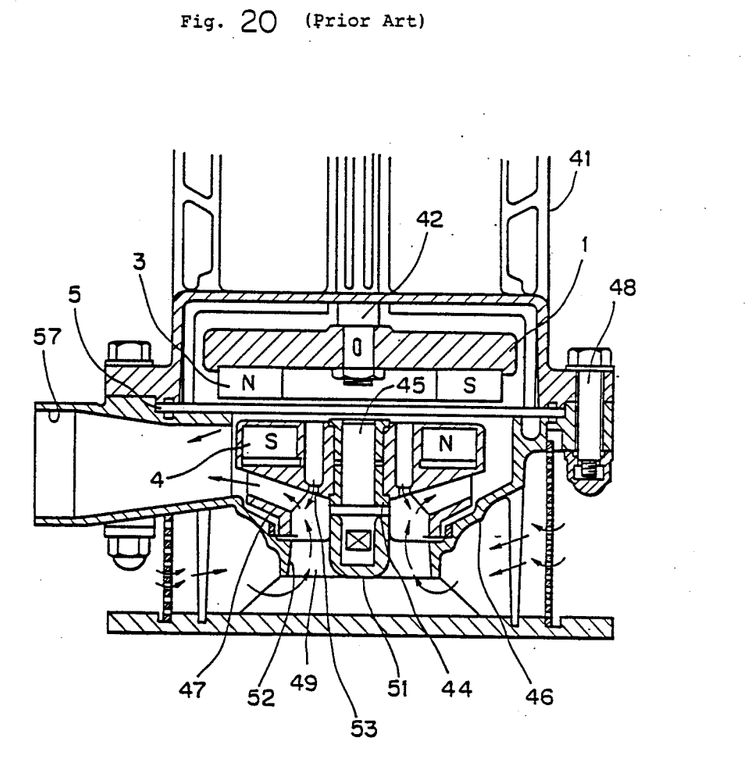
FIG. 20 is a vertical sectional view of a conventional magnet pump.

Referring to FIG. 20, which is a vertical sectional view, when a motor 41 is energized, a motor shaft 52 is rotated, and a yoke 1 secured to the end of the motor shaft 52 is rotated, thus causing rotation of a drive-side magnet 3 consisting of permanent magnets which are alternately different in polarity and secured while being circumferentially arranged on the end face of the yoke 1. In consequence, a driven-side magnet 4 consisting of a permanent magnets which are alternately different in polarity and secure while being circumferentially arranged on an impeller 47 rotates in response to the rotation of the drive-side magnet 3 through an isolating plate 5 which hermetically isolate the respective interiors of the motor 41 and a pump casing 46, and the impeller 47 rotates on a fixed shaft 45 through a bearing metal 44 driven into the impeller 47. The fixed shaft 45 is secured to a boss 51 in the center of arms 49 radially provided at a suction opening 52 in such a manner that the shaft 45 is prevented from rotating.

The liquid sucked in from the suction opening 52 by the rotation of the impeller 47 is increased in both speed and pressure before being discharged to a discharge opening 57. In the prior art, since bearing is arranged as described above, the bearing structure is complicated, and the pump casing also has a complicated configuration, and further, the suction opening has a configuration which involves a high suction resistance. In addition, in order to prevent the impeller 47 from moving toward the motor 41 the impeller main plate needs to be provided with balance holes 53 to balance thrust, which results in lowering in the efficiency. The driven-side magnet 4 needs to be sufficiently separated from the isolating plate 5 in order to allow whirling at the time when the bearing metal 44 and the fixed shaft 45 become worn and to permit the liquid to be circulated to the reverse side of the impeller 47 through the balance holes 53, which results in the problem that the transfer efficiency of the magnet coupling is low.

Figure 21:
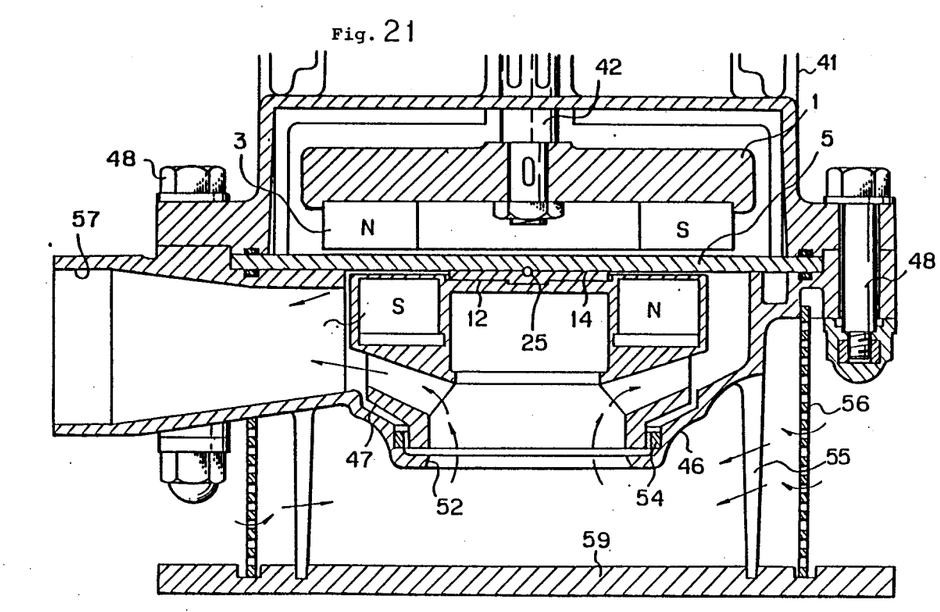
FIG. 21 is a vertical sectional view showing one application of the present invention.

FIG. 21 is a vertical sectional view of one embodiment of the present invention in a pump to which a synchronous magnet coupling is applied. A drive-side magnet 3 consisting of permanent magnets which are alternately different in polarity is secured to the periphery of the end face of a yoke 1 which is made of a magnetic insulator and which is secured to the end of a motor shaft 42 of a motor 41. A lower bracket of the motor 41 and a pump casing 46 are hermetically secured to each other by combinations 48 of bolts and nuts through an isolating plate 5 made of a non-mangetic material. Ther reference numeral 54 denotes a liner ring which is press-fit into the pump casing 46 so as to fit with the outer periphery of the suction portion of the impeller with a minimized gap to thereby seal water.

An impeller-side magnet 4 which is formed in such a manner that permanent magnets having different polarities are alternately arranged is buried in and fixed to the end portion of the impeller 47 on the side thereof which is closer to the motor 41 so that the magnet 4 faces the drive-side magnet 3 across the isolating plate 5.

A strainer 56 is retained so as to cover the outer periphery of the pump casing 46 by a base plate 59 into which legs 55 of the pump casing 46 are fitted and which is pulled toward the pump casing 46 by means of bolts (not shown).

The pump casing 46 has a suction opening 52 which is opened throughout it including the central portion thereof while the impeller 47 has no balance holes, and a backing plate 12 in the shape of a disk which serves as a member having a slide surface of a flat plate which is to be provided on the rotary portion of the pump is secured to the rear surface of the impeller 47 by means of bonding. The surface of the isolating plate 5 which faces the backing plate 12 has the same diameter as that of the backing plate 12 and slightly projects in the axial direction to define a thrust bearing portion 14 provided with spiral grooves 16 except for its central portion as shown in FIG. 3, while a high viscosity lubricant is sealed in the area between the backing plate 12 and the isolating plate 5 in advance, and the backing plate 12 is held to the thrust bearing portion 14 of the isolating plate 5 by suction. Hemispherical recesses 22 and 23 are respectively provided in the centers of the isolating plate 5 and the backing plate 12 as shown in FIG. 5, and a small ball 25 is fitted in the recesses The gap between the small ball 25 and each of the recesses 22, 23 is set so that a slight clearance is present therebetween when the isolating plate 5 and the rotary backing plate 12 are in solid contact with each other.

In the above, the isolating plate 5 is made of silicon carbide SiC of β-crystal, and the spiral grooves 16 are formed by shot blasting using a photomask laid over the plate 5, the depth of the grooves 16 being 3 to 50 μm. The flat surface portion of the thrust bearing portion 14 is mirror-finished with a flatness of 1 μm. The backing plate 12 is formed using silicon carbide SiC or a stainless steel material or cast iron and has its slide surface mirror-finished with a flatness of 1 μm. The small ball 25 is made of acircular crystals of silicon carbide β-SiC or a bearing steel. Fluorine oil is employed as a high-viscosity lubricant.

The diameter of the backing plate 12 is 60 mm, and the spiral grooves 16 extend to the outer periphery and has a depth of 10 μm. The diameter of the small ball 25 is 1.58 mm. The test was carried out with the gap between the isolating plate 5 and the impeller-side magnet 4 set at from 10 to 50 μm.

In the pump shown in FIG. 21, when the motor 41 is energized so as to rotate counterclockwise (see FIG. 3) as viewed from the lower side of the FIG. 21, the impeller-side magnet 4 rotates in the same direction, and the backing plate 12 rotates together with it. The rotation of the backing plate 12 in the counterclockwise direction as viewed from the lower side causes a high-viscosity lubricant 26 to generate a dynamic pressure toward the center by the action of the spiral grooves 16, thus forming a hydrodynamic bearing which carries the thrust of the impeller 47 acting toward the motor.

In this embodiment, the thrust load can be carried and, in addition, since the suction adhering force acting between the isolating plate 5 and the backing plate 12 is about 100 to 200 kgf, the radial load is carried by the bearing constituted by the small ball 25 and the recesses 22, 23 and the bending moment generated on the basis of the radial load is carried by both the portion including the small ball 25 and the suction adhering force acting between the thrust bearing portion 14 and the backing plate 12. Accordingly, the arrangement of the pump on the side thereof which is closer to the suction opening 52 is simplified, and the pump casing 46 is also simple( so that the suction resistance is reduced.

Figure 22:
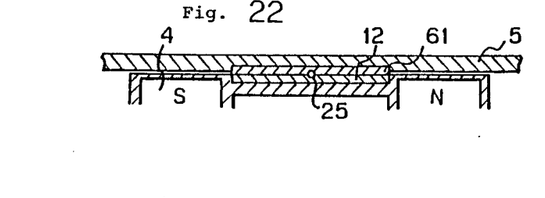
FIG. 22 is a vertical sectional view of another example of the application shown in FIG. 21.

FIG. 22 is a vertical sectional view of another embodiment of the arrangement of the thrust bearing.

Although in the above-described embodiment the spiral grooves 16 are directly provided to constitute a dynamic pressure thrust bearing, the arrangement may be such that a bearing plate in the shape of a disk which has spiral grooves 16 provided in its lower surface is secured to the isolating plate 5 by means of fitting or a combination of fitting and bonding and the backing plate 12 is brought into slide contact with the backing plate 12.

Further, in each of the above-described embodiments the arrangement may be such that spiral grooves 16 are provided in the slide surface of the backing plate 12 and the slide surface of the opposing isolating plate 5 or bearing plate 61 is employed to define a flat surface.

In each of the above-described embodiments, the direction of rotation is limited to one direction in which a dynamic pressure is generated in the hydrodynamic thrust bearing.

Figure 23:
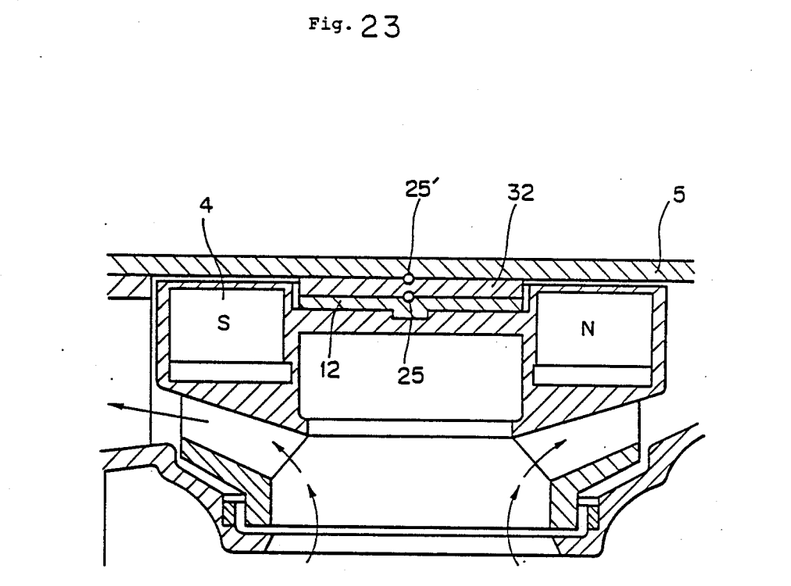
FIGS. 23 and 24 are vertical sectional views showing other application examples of the present invention.
Figure 24:
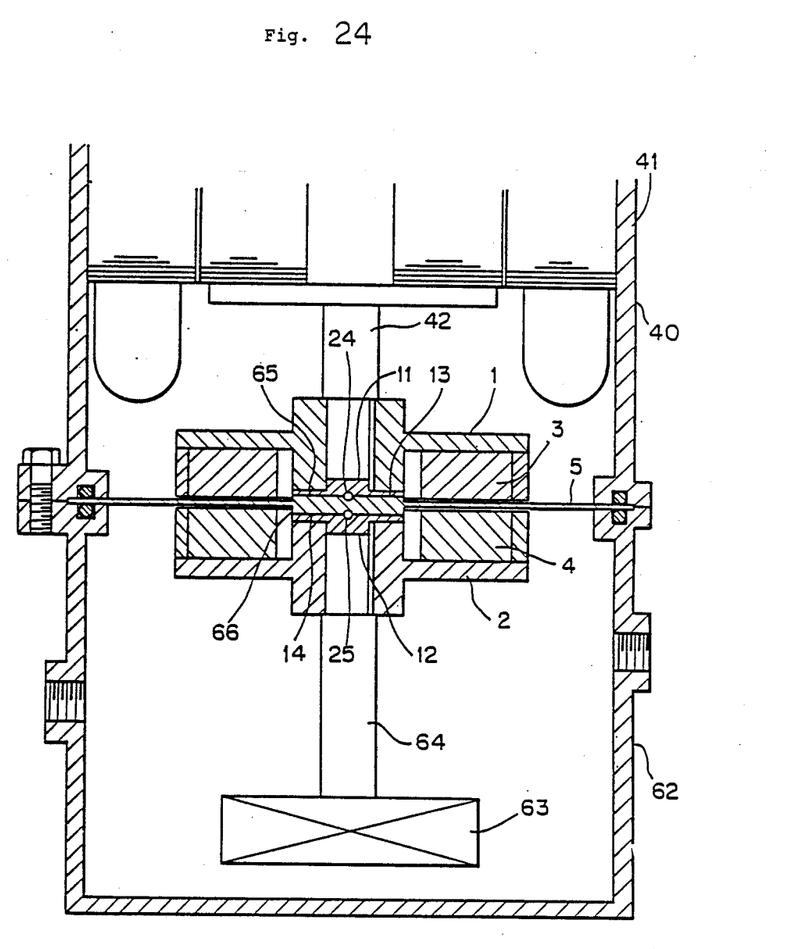

FIG. 23 is a vertical sectional view of an embodiment in which the hydrodynamic thrust bearing is arranged so as to be rotatable both forwardly and backwardly and in which the portion other than the bearing portion are the same as those shown in FIG. 21. An intermediate plate 32 is provided with spiral grooves 16 and 16' which are formed in both surfaces thereof in such a manner that the grooves are twisted in the same direction as viewed from the same side as shown in FIG. 16 which is a bottom view of the intermediate plate 32. The isolating plate 5 and the backing plate 12 define flat slide surfaces which slide with respect to the intermediate plate 32. Small balls 25 and 25' are received in respective hemispherical recesses formed in the centers of the intermediate plate 32, the isolating plate 5 and the backing plate 12. Each of the gaps between the small balls 25, 25' and the recesses for receiving the balls 25, 25' and each of the gaps between the slide surfaces of the intermediate plate 32 on the one hand and the respective slide surfaces of the isolating plate 5 and the backing plate 12 on the other are similar to those in the case of the hydrodynamic thrust bearing for rotation in one direction, and a high-viscosity lubricant is sealed in these gaps. When the backing plate 12 rotates together with the impeller-side magnet 4 clockwise as viewed from the lower side of FIG. 23, that is, as viewed in FIG. 16, a hydrodynamic bearing is formed by the action of the spiral grooves 16 in the lower surface of the intermediate plate 32, thus carrying the thrust load. When the intermediate plate 32 is energized to rotate clockwise, the high-viscosity lubricant in the spiral grooves 16' provided in the upper side of the intermediate plate 32 is caused to move toward the outer periphery, resulting in a vacuum being generated in the center, and thus allowing the intermediate plate 32 to adhere to the isolating plate 5 by suction. When the backing plate 12 rotates counterclockwise as viewed from the lower side, the high-viscosity lubricant in the spiral grooves 16 provided in the lower surface of the intermediate plate 32 is caused to move toward the outer periphery, resulting in the central portion thereof being vacuum-held to the backing plate 12 and rotating together with it. The counterclockwise rotation of the intermediate plate 32 causes the high-viscosity lubricant to move toward the center by the action of the spiral grooves 16' in the upper surface of the intermediate plate 32, thus enabling the area between the intermediate plate 32 and the partition wall 5 to serve as a hydrodynamic bearing which carries the thrust load.

Figure 25:
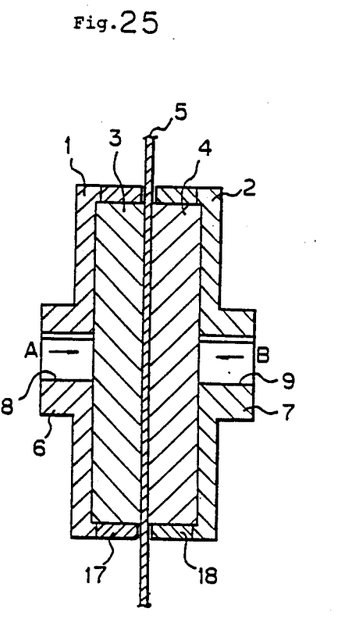
FIG. 25 is a vertical sectional view of a high-performance synchronous magnet coupling in accordance with one embodiment of the present invention.

FIG. 25 shows a high-speed agitator for stirring a corrosive liquid such as a chemical in accordance with a still further embodiment of the present invention.

An isolating plate 5 is secured so as to be hermetically interposed between the upper part of a tank 62 and a motor frame 40. Accordingly, the respective interiors of the tank 62 and the motor 42 are fluidically isolated from each other, so that, even if a chemical which is cast into the tank 62 is a harmful liquid such as a corrosive liquid there is no effect on the motor 41. An agitating shaft 64 which has an agitating blade 63 at its distal end is provided with a disk-shaped yoke 2 which is integral with or secured to the proximal side of the shaft 64, and a magnet 4 on the side of the agitating blade 63 is secured to the yoke 2. The magnet 4 is disposed in close proximity with the isolating plate 5 with a gap of 10 to 30 μm provided therebetween.

On the side of the motor 41, a yoke 1 is secured to a motor shaft 42, and a drive-side magnet 3 is secured to the yoke 1 in such a manner that a gap of 10 to 30 μm is produced between the end face of the drive-side magnet 3 and the isolating plate 5. A radial load acting on the motor shaft 42 is carried by an upper end bearing (not shown), and the motor shaft 42 is allowed to move slightly in the axial direction.

Bosses 65 and 66 are provided on both sides, respectively, of the central portion of the isolating plate 5 and spiral grooves 15 and 16 (not shown) are respectively provided in the bosses 65 and 66 in the same way as in the embodiment shown in FIG. 4. A high-viscosity lubricant is sealed in the area between these opposing surfaces.

When the motor 41 is energized and the motor shaft 42 rotates, the yoke 1 rotates in such a manner that the thrust and radial loads applied from the motor 41 are carried by the thrust bearing portion 13 and the small ball 24 provided between the backing plate 11 and the boss 65. The drive-side magnet 3 causes the driven-side magnet 4 to rotate in the same direction, and the yoke 2, the agitating shaft 64 and the agitating blade 63 are thus rotated. The thrust load acting on the agitating blade 63 is supported by the slide surfaces of the thrust bearing portion 14 of the boss 66 and the backing plate 12, while the radial load is carried by the small ball 25. This thrust bearing is capable of carrying a relatively heavy load applied in the direction in which the slide surfaces are compressed and also bears a load of about 200 kgf applied in the direction in which the slide surface are separated from each other, as described above, and since the small ball is provided, the bearing can carry the radial load applied by the agitating blade 63 and the bending moment at the proximal surface of the yoke 2 which is based on the radial load.

FIG. 25 shows a still further embodiment of the present invention, in which the efficiency of the synchronous magnet coupling shown in FIG. 1 is further improved.

Namely, FIG. 25 is a vertical sectional view of a synchronous magnet coupling in which magnets 3 and 4 each consisting of permanent magnets alternately different in polarity are respectively secured to the opposing end faces of a drive-side yoke 1 and a load-side yoke 2 which is concentrical with respect to the yoke 1, and an isolating plate 5 in the shape of a flat plate which is made of a non-magnetic ceramic material, e.g., silicon carbide SiC, is interposed between the magnets 3 and 4.

Although a liquid permeates into each of the areas between the magnets 3, 4 and the isolating plate 5 in the form of an extremely thin liquid film, they are substantially in close contact with each other.

Bosses 6 and 7 are provided integral with the respective central portions of the yokes 1 and 2, and key ways are provided in respective central bores 8 and g of the bosses 6 and 7 so that drive and driven shafts are attached to the bosses 6 and 7 rigidly against rotation. The reference numerals 17 and 18 denote aluminum or brass rings which are fitted on the respective outer peripheries of the magnets 3 and 4 to limit leakage of magnetic field.

Since in this embodiment spiral grooves are formed in the surfaces of the isolating plate 5 which face the magnets 3 and 4, respectively, the structure is further simplified and the distance between the magnets 3 and 4 is shortened which means that the efficiency is improved.

EFFECTS OF THE INVENTION

The present invention provides a magnet coupling in which a load-side rotary member and a drive-side rotary member are hermetically coupled through an isolating plate and connected together through magnetic couplings, characterized in that a bearing is provided between the isolating plate and the load-side rotary member and/or between the isolating plate and the drive-side rotary member, whereby the drive- and driven-side magnetic couplings can be disposed close to each other and the transfer efficiency is therefore greatly improved.

In the first embodiment of the present invention, the bearing in the above-described arrangement is formed in such a manner that the respective end faces of the isolating plate and the above-described rotary members define slide surfaces and spiral grooves for generating dynamic pressure are provided in either one of the opposing slide surfaces. Therefore, each magnetic coupling can be disposed with a minute gap between the same and the isolating plate, so that it is possible to obtain a magnet coupling of extremely high efficiency.

In the second embodiment of the present invention recesses are provided in the respective centers of the opposing slide surfaces in the above-described embodiment and small balls are received in the recesses, so that both thrust and radial loads can be carried. Accordingly, each rotary member can be supported at both ends thereof, and the supporting conditions can be bettered.

In the third embodiment of the present invention, the above-described bearing according to the present invention has intermediate plates which are respectively disposed between the isolating plate and the rotary members and each of which has both surfaces thereof slidable with respect to the isolating plate and the corresponding rotary member, and recesses are provided in the centers on both sides of each intermediate plate and in the isolating plate and the rotary member which faces the intermediate plate and balls are received in the recesses. Further, each intermediate plate or the rotary member which slides with respect to this intermediate plate and the isolating plate are provided with spiral grooves twisted in such directions that a dynamic pressure is generated on either one of the slide surfaces on both sides of the intermediate plate and a lubricant is expelled on the other. Accordingly, the embodiment allows rotation in both forward and backward directions and offers the above described effects.

According to the fourth embodiment of the present invention, in each of the above-described magnet couplings a high-viscosity lubricant is sealed in the area between the slide surfaces of the bearing in advance. Therefore it can be employed regardless of environmental conditions. Further, it is possible, according to the second embodiment, to support each of the drive- and load-side rotary members in a cantilever fashion.

We claim:

1. A magnet coupling in which a load-side rotary member and a drive-side rotary member are placed in different environments through an isolating plate, and said loadside rotary member and said drive-side rotary member are connected together by means of magnetic couplings, characterized in that the respective end faces of said load- and drive-side rotary members which face said isolating plate are formed from a rigid ceramic material, said isolating plate being also formed from a rigid ceramic material, said end faces and the surfaces of said isolating plate facing them being defined by smooth flat surfaces, and the ceramic material which forms either one of said opposing end faces or the surfaces of said isolating plate being provided with a spiral groove, whereby, when said drive- and load-side rotary members rotate in a normal direction of rotation, said load- and drive-side rotary members and said isolating plate are allowed to slide without coming into contact with each other by the dynamic pressure effect of said spiral groove produced at each side of said isolating plate.

2. A magnet coupling according to claim 1, wherein said rigid ceramic material is any material selected from among aluminum oxide, silicon carbide and silicon nitride which are sintered under an ordinary or high pressure.

3. A magnet coupling according to claim 1, wherein said load-side rotary member and said isolating plate have respective hemispherical recesses formed at positions on the line which intersects the centers of rotation of the opposing surfaces, and a small ball is received in a substantially spherical space defined by these two recesses, said ball having a diameter equal to or smaller than the diameter of said space.

4. A magnet coupling according to claim 1, wherein a magnetic fluid or a lubricant is attached to the slide surfaces of said drive-side rotary member and said isolating plate in advance.

5. A magnet coupling according to claim 1, wherein said rigid ceramic material is any material selected from among aluminum oxide, silicon carbide and silicon nitride which are sintered under an ordinary or high pressure, and wherein said load-side rotary member and said isolating plate have respective hemispherical recesses formed at positions on the line which intersects the centers of rotation of the opposing surfaces, and a small ball is received in a substantially spherical space defined by these two recesses said ball having a diameter equal to or smaller than the diameter of said space.

6. A magnet coupling according to claim 5, wherein a magnetic fluid or a lubricant is attached to the slide surfaces of said drive-side rotary member and said isolating plate in advance.

7. A magnet coupling according to claim 1, wherein said rigid ceramic material is any material selected from among aluminum oxide, silicon carbide and silicon nitride which are sintered under an ordinary or high pressure, and wherein a magnetic fluid or a lubricant is attached to the slide surfaces of said drive-side rotary member and said isolating plate in advance.

8. A magnet coupling according to any one of claims 1 to 7, wherein said load-side rotary member is an impeller of a pump.

* * * * *